Patented Mar. 4, 1941

2,233,439

UNITED STATES PATENT OFFICE 2,233,439

PROCESS FOR THE MANUFACTURE OF ISOLATED VEGETABLE PROTEIN

Eric Wahlforss, Agelzy, Finland, and John A. Satosky, deceased, by Helen Satosky, administratrix, Cleveland, Ohio, assignors to The Glidden Company, Cleveland, Ohio, a corporation of Ohio No Drawing. Application February 17, 1937, Serial No. 126,237

5 Claims. (Cl. 134—12)

This invention relates to oleaginous seed proteins of the alkali-soluble type, and has particular reference to a new and novel process for the isolation of this type of protein. More particularly, this invention contemplates an improvement in the process of the Cone and Brown Patent 1,955,375, granted April 17, 1934, whereby improved yields of material are obtained, without loss of any desirable properties of lime solubility, low solution viscosity and good adhesion and color.

Before the advent of the Cone and Brown process, casein and glue were the only proteins used in the paper trade for coating paper. As described in said Patent 1,955,375, the use of casein was and is accompanied by certain difficulties therein discussed, particularly foaming, susceptibility to lime, to the further difficulties of a tendency to putrefy, and of lack of uniformity, due to differences in source of supply, or variations in the milk of even identical herds of cows under different feeding conditions, and to a difficulty formerly considered insurmountable— a solution viscosity of such a character that only low solid concentrations could be attained in the coating compositions. Glue gives poorer results than casein, and is very rarely used.

The use of oleaginous seed proteins as substitutes for casein was suggested and practiced long before the entry of Cone and Brown into the field. A large number of investigators in the field have utilized the oil seed, with the oil removed, as such, as a combined substitute for casein and filler. Satow, in a series of United States patents, describes various methods of isolating such a protein, and utilizing it as a substitute for casein. Cone and Brown, however, taught the art that in order to get the best results from the protein, it was necessary to denature it, i. e. expose it after extraction to the action of an alkali, whereby it became more easily soluble after drying in a weak alkali, and whereby the solution viscosity was lowered to a point where it was lower than milk casein, while at the same time having as good or better adhesion properties in binding the paper coating to the paper. The principal advantage of the process lies in the fact that controlled uniform viscosity can be attained.

The isolation of vegetable protein, following the process of the Cone and Brown patent, has one serious disadvantage, the yields possible being rather low. For example, starting with a solvent extracted soya bean flour containing under 5% fiber, about 0.5% oil, and 48-49% of protein, yields are obtained of the order of 20-25% overall, more than half of the protein being rejected. Part of this loss is due to operations; part is water soluble albumen and part is prolamine protein, insoluble in dilute alkali. The method, however, rejects the lime insoluble globulins, which are separated as lime salts, or allowed to remain in the meal for later recovery by caustic alkali.

We have discovered, however, that if these proteins be taken up into solution with a strong enough alkali (caustic soda, caustic potash, sodium carbonate) to dissolve all the protein and lime added to denature the protein in quantity sufficient to keep the pH at about 11.0 or higher and the denaturing continued in the presence of the insoluble residue and the precipitate caused by the addition of the lime, a portion of the insolubles proteins are solubilized; and the yield of lime soluble proteins may be increased, to the order of 30-32% based on the weight of the original meal in the case of the above meal. The protein yield is thus increased from 50% or less to as high as 67%, without loss of the vital property of easy solubility, and with no loss of any of the other desirable features of the uniform low viscosity, high strength protein which can be prepared by this process.

We have found further that if good color is to be preserved in our product, the temperature should be kept under 100–110° F., and preferably even lower. While the denaturing action is more rapid at higher temperatures, discoloration is obtained with caustic alkalies.

In our preferred process, we take a relatively oil-free seed meal, and digest it with water and a strong alkali, such as caustic soda, at a pH of 11.0 or higher, this high pH being needed to thoroughly extract all the alkali soluble protein. We then add sufficient lime to prevent a drop in pH to below this point, such a drop being caused by the denaturing of the protein in the absence of sufficient alkali, due to absorptions of alkali by protein. The denaturing continues for a considerable period, preferably about 16-20 hours at about 60–80° F. At a late stage in the process, the solid matter is separated from the solution, by settling, filtrations or centrifugal action; the clear solution is then precipitated by reducing its pH to the isoelectric point of the globulins (pH 4.6–4.8) preferably in the presence of a reducing agent if good color is to be obtained. This is preferably done by some acid. If sulfuric acid is used, the globulins precipitate, with some occluded calcium sulfate, which increases the yield somewhat, without any apparent loss in properties. The precipitate is separated from the whey, containing albumens and carbohydrates, preferably by filtration, washed and dried.

Typical procedures for the production of protein are given in the following examples:

Example 1

One hundred pounds of soya bean meal, obtained by extracting soya bean oil with petroleum naphtha, and having 0.25% oil in the residue, were mixed in a wooden tank with 1,500 pounds of water at 85° F. After ten minutes, 3 pounds of caustic soda flakes were added, and the mixtures stirred for 1 hour. At this point, the solution had a pH of 12.1. Seven pounds of hydrated lime, slurried in water, was then added; the pH rose to 12.6. The mixture was stirred for two hours; the pH at this time had not dropped. The mixture was kept in the tank for about 14 hours, at 85° F.; the solution was siphoned from the settled residue, was caught in a tank, and 5 pounds of dry sodium sulfite added. Sulfuric acid was added (1 part 66° Baumé acid to 7 water) to a pH of 4.6–4.7; the precipitate was allowed to settle for two hours, and then the mother liquor was siphoned off; the curd was washed, settled and siphoned; and pumped into a filter press. The press cake was then dried in an inert atmosphere. This gave a yield of 32 pounds of protein; the actual protein content was somewhat lower, as the material had an ash content of about 3%.

Example 2

The above procedure was duplicated, except that extracted peanut meal was substituted for the soya meal. The yield of protein was 28.0%, as compared to an original total protein content of 50.0%.

We consider our invention to reside in the discovery that lime insoluble protein can be rendered lime soluble by continued digestion in the presence of lime and a caustic alkali, at a relatively high pH.

We claim:

1. The method of rendering lime insoluble vegetable protein lime soluble, comprising digesting said lime insoluble vegetable protein with a solution of alkali and lime, maintained at a pH about 11.0 or above.

2. The method of isolating lime soluble vegetable protein in high yield, comprising extracting protein from a proteinaceous seed meal with a caustic alkali solution, the amount of caustic alkali being sufficient to produce a pH of about 11 or above, adding lime, digesting the meal while denaturing the protein in solution while maintaining the pH at about 11 or higher, separating the solution from the insoluble residue, and thereafter precipitating the protein from the solution.

3. The method of isolating lime soluble vegetable protein in high yield, comprising extracting protein from a proteinaceous seed meal with an alkali solution, adding lime, digesting the meal while denaturing the protein in solution, while maintaining the pH at about 11 or higher, separating the solution from the insoluble residue, and thereafter precipitating the protein from the solution by adjusting the pH of the solution to the isoelectric point of the protein.

4. The method of isolating lime soluble vegetable protein in high yield comprising extracting a proteinaceous seed meal with an alkali solution at a pH 11.0 or above, adding lime in amount sufficient to maintain a pH 11.0 or above and digesting the meal while denaturing the protein in solution, separating the solution from the insoluble, and adjusting the pH of the solution to the isoelectric point of the protein to precipitate the protein.

5. The method of isolating soya bean protein in high yield comprising extracting soya bean meal with an alkali solution at a pH about 11.0 or above, adding lime in amount sufficient to maintain a pH about 11.0 or above and digesting the meal while denaturing the protein in solution, separating the solution from the insolubles, and precipitating the protein from the solution.

ERIC WAHLFORSS.
HELEN SATOSKY,
*Administratrix of the Estate of John A. Satosky, Deceased.*